United States Patent
Masser (12) United States Patent (10) Patent No.: US 8,602,681 B1
(45) Date of Patent: Dec. 10, 2013

(54) MODULAR STORM WATER INFILTRATION APPARATUS

(75) Inventor: Jeremy Masser, Fenton, MI (US)

(73) Assignee: Structural Plastics, Inc., Holly, MI (US)

( * ) Notice: Subject to any disclaimer, the term of this patent is extended or adjusted under 35 U.S.C. 154(b) by 275 days.

(21) Appl. No.: 13/028,265

(22) Filed: Feb. 16, 2011

Related U.S. Application Data (60) Provisional application No. 61/305,565, filed on Feb. 18, 2010.

(51) Int. Cl.
*E02B 13/00* (2006.01)

(52) U.S. Cl.
USPC .......................................... 405/43

(58) Field of Classification Search
USPC ................. 405/36, 43, 50; 52/302.4; 239/54
See application file for complete search history.

(56) References Cited

U.S. PATENT DOCUMENTS

| | | | | |
|---|---|---|---|---|
| 4,118,892 A | * | 10/1978 | Nakamura et al. | 47/65.9 |
| 4,983,069 A | * | 1/1991 | Florence | 405/43 |
| 5,617,679 A | * | 4/1997 | Meyers | 52/20 |
| 5,810,510 A | * | 9/1998 | Urriola | 405/45 |
| 6,837,652 B1 | | 1/2005 | Rost et al. | |
| 6,854,231 B2 | * | 2/2005 | MacDonald et al. | 52/562 |
| 7,011,474 B2 | * | 3/2006 | MacDonald | 405/284 |
| 7,080,480 B2 | * | 7/2006 | Urban et al. | 47/48.5 |
| 7,163,635 B2 | | 1/2007 | Fitzgerald | |
| 7,363,936 B1 | | 4/2008 | Simoneaux et al. | |
| 7,485,218 B2 | | 2/2009 | Dussich | |
| 7,540,953 B2 | | 6/2009 | Fitzgerald | |
| 7,591,610 B2 | * | 9/2009 | Krichten et al. | 405/50 |
| 7,621,695 B2 | * | 11/2009 | Smith et al. | 405/43 |
| 7,637,056 B2 | * | 12/2009 | Tajima et al. | 47/65.9 |
| 8,065,831 B2 | * | 11/2011 | Ray et al. | 47/32.7 |
| 2008/0044231 A1 | * | 2/2008 | Roelfsema | 405/129.57 |

FOREIGN PATENT DOCUMENTS

EP 1416099 * 5/2004

* cited by examiner

*Primary Examiner* — John Kreck
(74) *Attorney, Agent, or Firm* — Young Basile Hanlon & MacFarlane P.C.

(57) ABSTRACT

A modular storm water infiltration apparatus for directing water into an adjacent soil column. The apparatus includes a plurality of infiltration chambers each having a bottom panel and a peripheral wall that define an interior for storing water. The peripheral wall of each infiltration chamber has at least one infiltration aperture formed therethrough for communicating water laterally into the soil column. The bottom panel of each infiltration chamber has at least one drain aperture formed therethrough for communicating water downwardly out of the infiltration chamber. The infiltration chambers are configured to be stacked vertically with respect to one another.

19 Claims, 6 Drawing Sheets

FIG. 10

MODULAR STORM WATER INFILTRATION APPARATUS

CROSS-REFERENCE TO RELATED APPLICATIONS

This application claims the benefit of U.S. Provisional Patent Application No. 61/305,565, filed on Feb. 18, 2010.

FIELD OF THE INVENTION

The present invention relates to the field of storm water management, and more particularly, to a modular storm water infiltration apparatus.

BACKGROUND OF THE INVENTION

In native terrain, the rate at which rainfall reaches the ground surface and the velocity with which it travels with respect to the ground surface is decreased drastically by vegetation. Due to collection of rainwater on trees, grasses, and other vegetation, it can take hours for rainwater to reach the earth's surface subsequent to a storm, as the water collects and travels downward from the vegetation to the earth's surface, where lateral flow of the water is further slowed and distributed by grasses and other vegetation. As a result, the storm water generated by a typical storm infiltrates the earth's surface and is absorbed into the soil, resulting in very little runoff and minimal erosion. In the ground, the absorbed water flows downward through the soil where the water is filtered through the soil by natural, physical, and chemical filtration processes. The naturally-filtered water eventually reaches the water table and becomes part of the ground water supply.

In a man-made environment, such as a city or a suburban residential area, the presence of impervious surfaces over a large portion of the earth renders complete infiltration of storm water impossible. These impervious surfaces include buildings, roadways, and other structures. In addition to blocking infiltration, these impervious surfaces also allow storm water to travel at high velocity. As a result, urban landscapes are susceptible to flooding and erosion absent some means of artificial storm water control.

Historically, municipalities have sought to control storm water using elaborate and expensive storm sewer systems. In such systems, storm water is directed into sewers for transportation to water treatment plants through networks of sewer pipes. The water treatment plants subsequently decontaminate the water before it is returned to the ground water supply. In practice, the volume of storm water directed to water treatment plants has proven impractical in certain circumstances. This is especially true in areas where the population has grown rapidly, and municipalities have been unable to expand the capacity of their water treatment facilities in correspondence with the rate of development.

Efforts have been made to manage storm water without directing the storm water into a sewer system. For example, water retention structures may be utilized to store water and gradually release it to a stream or other natural water feature. Infiltration ponds are formed using porous natural materials that allow storm water to be stored in the infiltration pond and gradually absorb into the ground. Underground water storage structures such as basins, vaults, and drywells provide for water storage and gradual infiltration. However, such structures typically drain water solely near the bottom of the structure, thereby preventing the storm water from naturally filtering through the soil as it travels downward toward the water table.

It would be desirable to have a modular structure that allowed storm water to be stored therein and infiltrate into the surrounding soil down the entire height of the structure.

SUMMARY OF THE INVENTION

The present invention provides a modular storm water infiltration apparatus for directing water into an adjacent soil column. The apparatus includes a plurality of infiltration chambers that each have a bottom panel and a peripheral wall that define an interior for storing water. The peripheral wall of each infiltration chamber has at least one infiltration aperture formed therethrough for communicating water laterally into the soil column. The bottom panel of each infiltration chamber has at least one drain aperture formed therethrough for communicating water downwardly out of the infiltration chamber. The infiltration chambers are configured to be stacked vertically with respect to one another.

The at least one drain aperture may include at least one overflow column that receives water at a top end and defines a passageway that extends through the base panel.

Each infiltration chamber may include at least one rib that extends upward from the bottom panel to define the interior into a plurality of sections to control the lateral disbursement of water within each infiltration chamber. In addition, the at least one drain aperture may include at least one overflow column that receives water at a top end and defines a passageway that extends through the base panel, wherein the top end of the at least one drain aperture is higher than a top edge of the at least one rib.

The peripheral wall of each infiltration chamber may extend generally upward from the base panel to define a generally rectangular structure having an open top opposite the base panel. Furthermore, the open top of each infiltration chamber may be adapted to receive water from an adjacent infiltration chamber.

The base panel of each infiltration chamber may be configured to engage an adjacent infiltration chamber to restrain relative motion of adjacent pairs of infiltration chambers. Furthermore, the base panel of each infiltration chamber may be configured to engage an upper edge of the peripheral wall of an adjacent infiltration chamber. In particular, at least one channel may be formed on the base panel of each infiltration chamber for engagement with an upper edge of the peripheral wall of an adjacent infiltration chamber.

The infiltration chambers may be configured to be vertically stacked in a staggered configuration.

Slots may be formed in an upper edge of the peripheral wall for directing water laterally into the soil column.

The plurality of infiltration chambers may include a first group of chambers having a first length and a second group of chambers having a second length that is approximately half the first length to allow the infiltration chambers to be stacked to form a substantially rectangular, wall-like structure.

BRIEF DESCRIPTION OF THE DRAWINGS

The description herein makes reference to the accompanying drawings wherein like referenced numerals refer to like parts throughout several views and wherein.

DETAILED DESCRIPTION OF THE PREFERRED EMBODIMENT

Referring to the drawings, the present invention will now be described in detail with reference to the disclosed embodiment.

Figure 1:
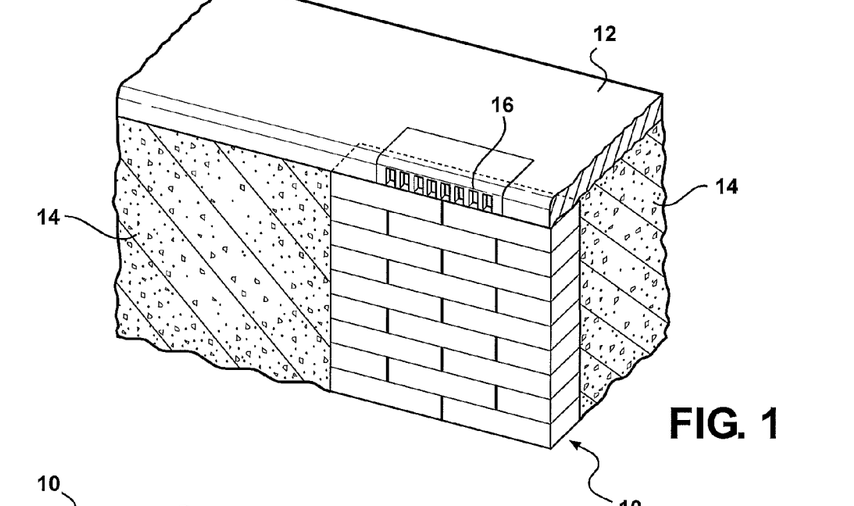
FIG. 1 is a sectional perspective view showing a water infiltration apparatus according to the present invention in a typical installation.

FIG. 1 shows a water infiltration apparatus 10 according to the present invention. The water infiltration apparatus 10 is designed to be installed below ground, such as below a sidewalk 12 or a street, and is surrounded by a soil column 14 that includes soil, sand, aggregate, or a combination thereof. Typically, an inlet basin 16 is disposed above the water infiltration apparatus 10 to direct water into the water infiltration apparatus 10. The inflow basin 16 may be provided with a filtering structure (not shown), such as a bed of coarse aggregate, to remove large debris from the water that is received by the inflow basin 16 before the water proceeds into the water infiltration apparatus 10. As the water passes through the water infiltration apparatus 10, the water is allowed to pass out of the infiltration apparatus 10 and into the soil column 14, wherein water infiltration begins toward the top of the water infiltration apparatus 10 but may also be accommodated toward the bottom of the water infiltration apparatus 10 during a rainfall event of sufficient duration and magnitude.

Figure 2:
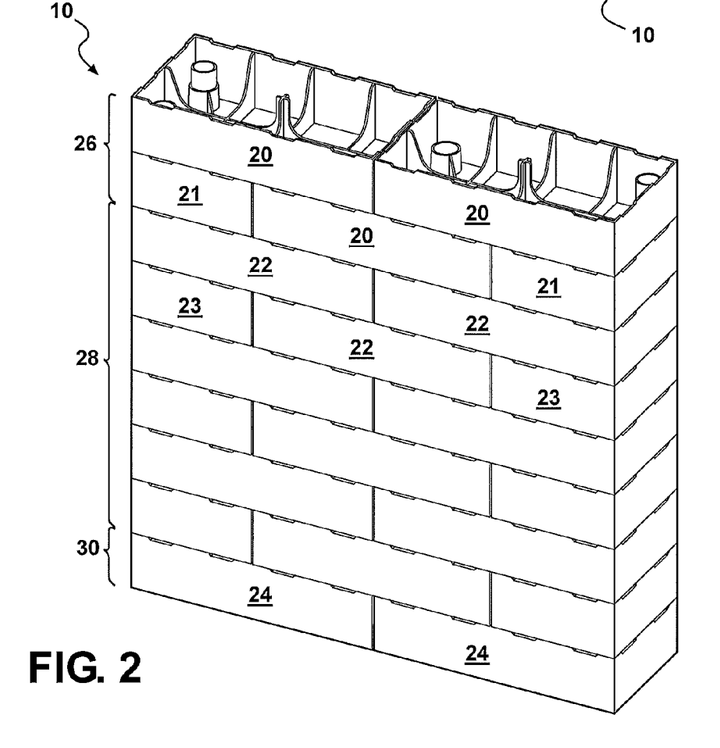
FIG. 2 is a perspective view showing the water infiltration apparatus according to the present invention.

As shown in FIG. 2, the water infiltration apparatus 10 is an upright, vertically-layered structure that includes a plurality of chambers 20-24 that are stacked in a staggered configuration. Although FIG. 2 illustrates a substantially rectangular, wall-like configuration for the water infiltration apparatus 10, it will be appreciated that the chambers 20-24 allow for a modular approach to construction of the water infiltration apparatus 10. Accordingly, the water infiltration apparatus 10 may be easily provided in a vast array of shapes, sizes, and configurations. In a typical configuration of the water infiltration apparatus, one or more receiving layers 26 are positioned at the top of the water infiltration apparatus 10 for receiving water from the inflow basin 16. Each receiving layer 26 includes one or more primary receiving chambers 20 and may include one or more secondary receiving chambers 21. A plurality of infiltration layers 28 are positioned below the receiving layers 26. Each infiltration layer includes one or more primary infiltration chambers 22 and may include one or more secondary infiltration chambers 23. A base layer 30 is positioned below the infiltration layers 28 at the bottom of the water infiltration apparatus 10. The base layer 30 includes one or more base chambers 24.

The receiving layers 26 define an open top 11 of the water infiltration apparatus 10 for receiving water from the inflow basin 16 and serve to facilitate even dispersion of water into the infiltrating layers 28. When the water infiltration apparatus 10 is operating within its processing capacity, water does not enter the soil column 14 from the receiving layers 26 of the water infiltration apparatus. The infiltration layers 28 allow water to drain into the soil column 14 that surrounds the water infiltration apparatus 10. The base layer 30 also allows water to pass into the soil column 14 and can serve to allow overflow of excess water from the water infiltration apparatus 10 in a situation where the processing capacity of the water infiltration apparatus 10 has been exceeded, as will be explained in detail herein.

Figure 3:
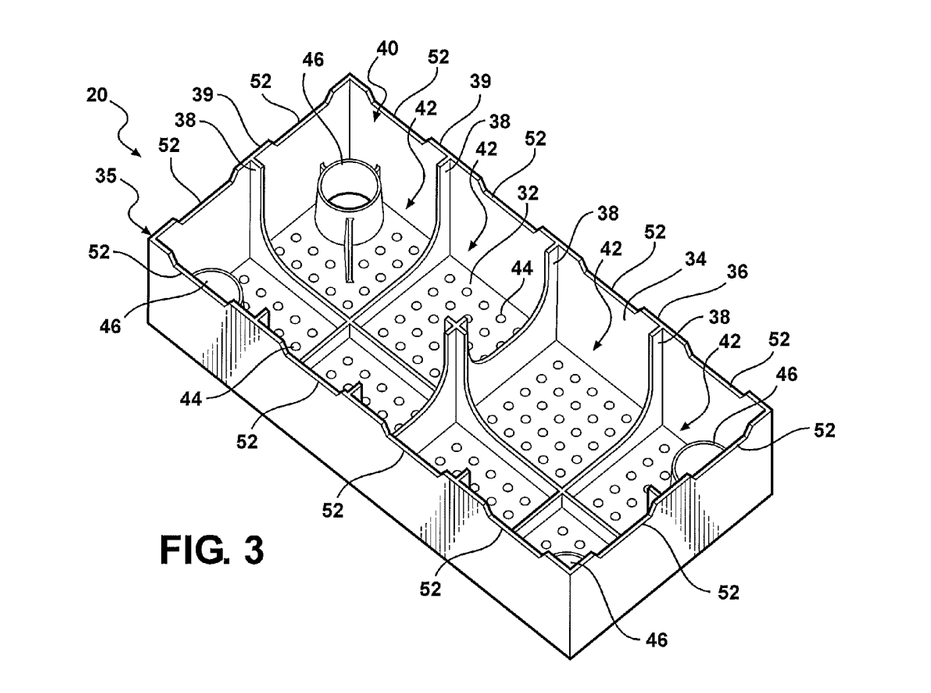
FIG. 3 is a perspective view showing a primary receiving chamber of the water infiltration apparatus according to the present invention.
Figure 4:
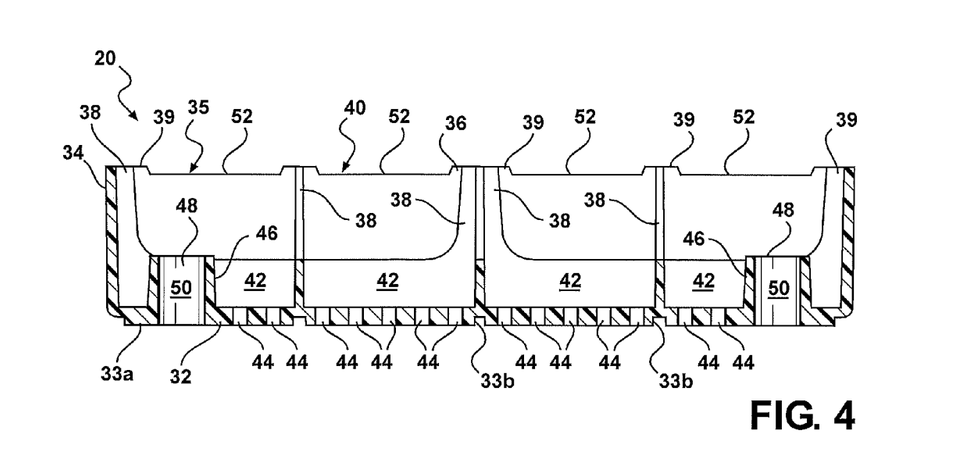
FIG. 4 is a sectional view showing the primary receiving chamber of the water infiltration apparatus according to the present invention

FIGS. 3-4 show the primary receiving chamber 20, which may be fabricated from a strong, lightweight plastic material by injection molding. The primary receiving chamber 20 includes a substantially planar bottom panel 32, a substantially rectangular, generally-upstanding peripheral wall 34, and an open top 35 opposite the bottom panel 32. The peripheral wall 34 is connected to the bottom panel 32 at the outer periphery thereof. The peripheral wall 34 extends generally upward from the bottom panel 32 and terminates at an upper edge 36. The peripheral wall 34 of the primary receiving chamber 20 may extend substantially perpendicular to the bottom panel 32 to define a thin-walled, substantially hollow, substantially rigid, rectangular five-sided structure for the primary receiving chamber 20.

A plurality of support ribs 38 may be provided within an interior 40 of the primary receiving chamber 20. The support ribs 38 extend upward from the bottom panel 32 and divide the interior 40 of the primary receiving chamber 20 and to a plurality of sections 42. The sections 42 are not in fluid communication with one another below the top edges of the support ribs 38. Thus, the support ribs 38 serve as baffles that prevent water from moving between the sections 42 unless the depth of the water within the primary receiving chamber 20 is higher than the support ribs 38. Thus, the support ribs 38 allow control over the lateral disbursement of water within the primary receiving chamber 20.

In order to interlock the primary receiving chamber 20 with vertically-adjacent chambers 20-24, one or more longitudinal channels 33a and/or one or more transverse channels 33b are formed on the exterior of the bottom panel 32. The channels 33a, 33b are configured to be engageable with the upper edge 36 and/or end portions 39 of the support ribs 38 of an adjacent chamber 20-24 that are at the same elevation as the upper edge 36. Engagement of the channels 33a, 33b with an adjacent upper edge 36 or an end portion of an adjacent support rib 38 resists sliding of vertically-adjacent pairs of chambers 20-24 with respect to one another to allow the chambers 20-24 to be stacked in an interlocking fashion.

In order to communicate water downward out of the primary receiving chamber 20, at least one drain aperture is provided, such as a plurality of drain holes 44 or the overflow columns 46. The plurality of drain holes 44 are formed through the bottom panel 32 of the primary receiving chamber 20. The drain holes 44 are narrow apertures that direct drops or small streams of water downward out of the primary receiving chamber 20. The plurality of drain holes 44 may be arranged such that a grouping or array of the drain holes 44 is provided within each of the sections 42 of the interior 40 of the primary receiving chamber 20.

In the event that water enters the primary receiving chamber 20 faster than it can be dispersed through the drain holes 44, a plurality of overflow columns 46 are provided within the interior 40 of the primary receiving chamber 20. The overflow columns 46 extend upward from the bottom panel 32 of the primary receiving chamber 20, such that an upper end 48 of each overflow column 46 is disposed at an elevation that is higher than that of the support ribs 38 and lower than that of a plurality of overflow slots 52. Within this range, the height of the upper end 48 of each of the overflow columns 46 may be selected to provide a desired storage capacity for storing water within the primary receiving chamber 20. Each of the overflow columns 46 defines a passageway 50 that extends through the overflow column 46 and through the bottom panel 32 of the primary receiving chamber 20. The passageways 80 of the overflow columns 46 are much larger in cross-sectional area than the drain holes 44, to allow the water to be directed downward into an adjacent one of the chambers 20-24.

In the event that water reaches the upper edge 36 of the peripheral wall 34 of the primary receiving chamber 20, water can pass out of the receiving chamber 20 through the overflow slots 52. The overflow slots 52 are formed on the upper edge 36 of the peripheral wall 34 as elongate depressions in the elevation of the upper end of the peripheral wall 34. Thus, as water approaches the upper edge 36 of the peripheral wall 34, it may pass through the overflow slots 52 and into the soil 14 adjacent to the water infiltration apparatus 10.

Figure 5:
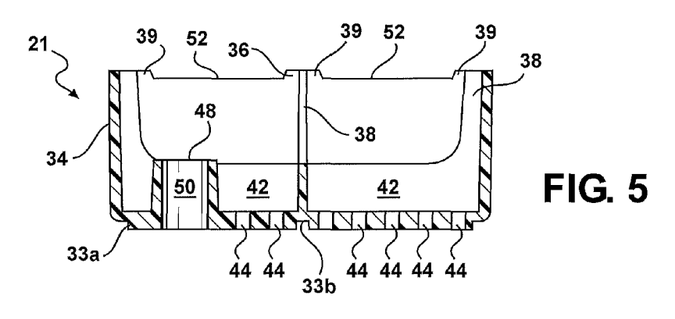
FIG. 5 is a sectional view showing a secondary receiving chamber of the water infiltration apparatus according to the present invention.

FIG. 5 shows the secondary receiving chamber 21. The secondary receiving chamber 21 is substantially identical in structure to the primary receiving chamber 20, with the exception that the secondary receiving chamber 21 is provided having a length that is approximately half the length of the primary receiving chamber 20. Thus, as in the illustrated embodiment, the receiving layers 26 may be provided having either two of the primary receiving chambers 24 or having one of the primary receiving chambers 24 and two of the secondary receiving chambers 21, and those receiving layers 26 will be substantially identical in length. This allows the primary receiving chambers 20 and secondary receiving chambers 21 of adjacent pairs of receiving layers 26 to be arranged in an interlocking, staggered fashion to form the receiving layers 26, as shown in FIG. 2. Of course, this configuration is exemplary in nature, and other configurations could be provided. For example, each of the receiving layers 26 could be provided with additional ones of the primary receiving chambers 24 to widen the water infiltration apparatus 10.

Figure 6:
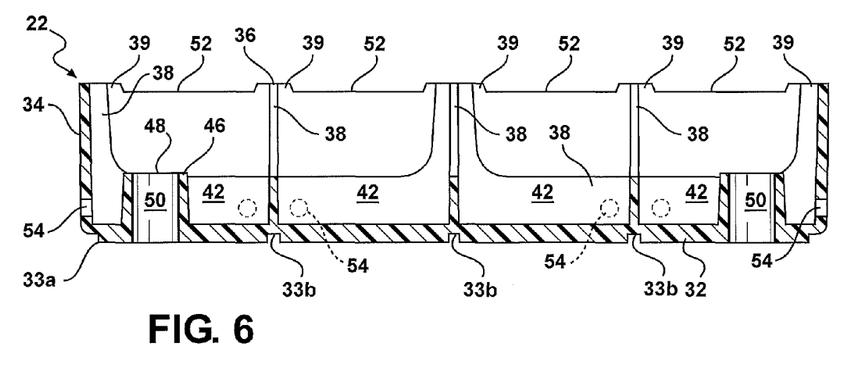
FIG. 6 is a sectional view showing a primary infiltration chamber of the water infiltration apparatus according to the present invention.

FIG. 6 shows the primary infiltration chamber 22 of the infiltration layers 28. The primary infiltration chamber 22 is substantially identical in structure to the primary receiving chamber 20, with the exception that the primary infiltration chamber 22 is configured to allow water infiltration into the soil column 14 that is laterally adjacent to the primary infiltration chamber 22. In order to allow infiltration into the soil column 14, vertically-oriented drain holes 44 are omitted in favor of horizontally-oriented infiltration apertures 54 that are formed through the peripheral wall 34 of the primary infiltration chamber 22. In particular, each of the sections 42 within the interior 40 of the primary infiltration chamber 22 is in communication with the soil column 14 through one or more of the infiltration apertures 54. Thus, water may exit the primary infiltration chamber 22 laterally into the soil through the infiltration apertures 54 or through the overflow columns 46 or overflow slots 52, in the event that the processing capacity of the primary infiltration chamber 22 is exceeded. Thus, the primary infiltration chamber 22 is configured to require complete infiltration through the infiltration apertures 54 until the water level reaches the upper ends 48 of the overflow columns 46. Of course, drain holes 44 could optionally be provided in the primary infiltration chambers 44 to provide desired fluid flow characteristics within the water infiltration apparatus 10. In addition, adjacent pairs of the primary infiltration chambers 22 could be connected to one another by facing pairs of the infiltration apertures 54, using fittings (not shown) or other suitable structures, to allow lateral disbursement of water within the infiltration layers 28.

Figure 7:
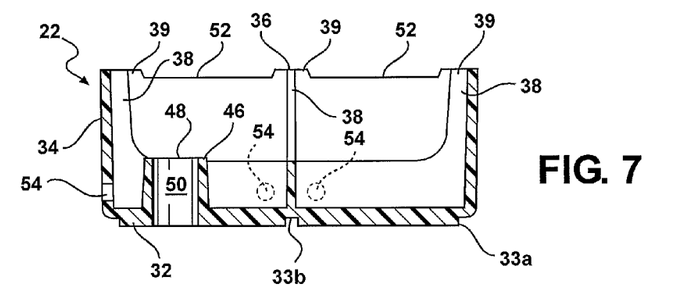
FIG. 7 is a sectional view showing a secondary infiltration chamber of the water infiltration apparatus according to the present invention.

As shown in FIG. 7, the secondary infiltration chamber 23 is identical in structure to the primary infiltration chamber 22 with the exception that the secondary infiltration chamber 23 has a length approximately half that of the primary infiltration chamber 22. This allows the infiltration layers 28 to be provided by stacking the primary infiltration chambers 22 and the secondary infiltration chambers 23 in an interlocking, staggered fashion.

Figure 8:
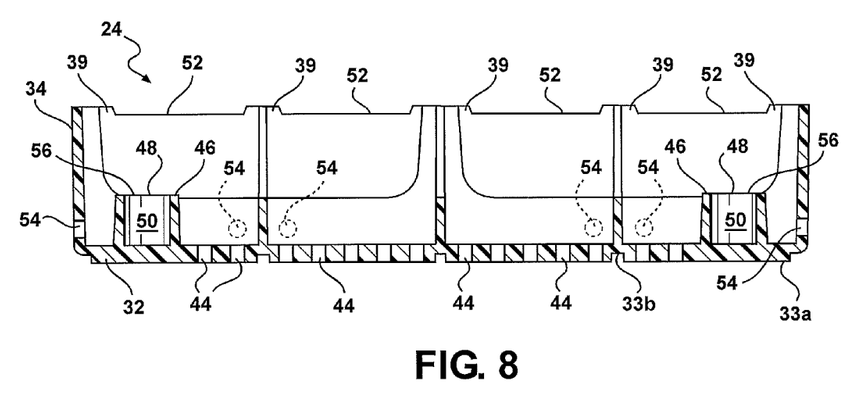
FIG. 8 is a sectional view showing a base chamber of the water infiltration apparatus according to the present invention.

As shown in FIG. 8, the base chamber 24 is substantially identical in structure to the primary infiltration chamber 22, with the exception that the overflow columns 46 are rendered non-functional by provision of a closed end 56 for each of the overflow columns 46, wherein the closed end 56 is coincident with the bottom panel 32 of the base chamber 24. Of course, the closed ends 56 of the base chamber 24 could be removed to accommodate overflow directly into the soil 14 under the base chamber 24 or to allow the overflow columns 46 to be connected to an external overflow drain (not shown).

Figure 9:
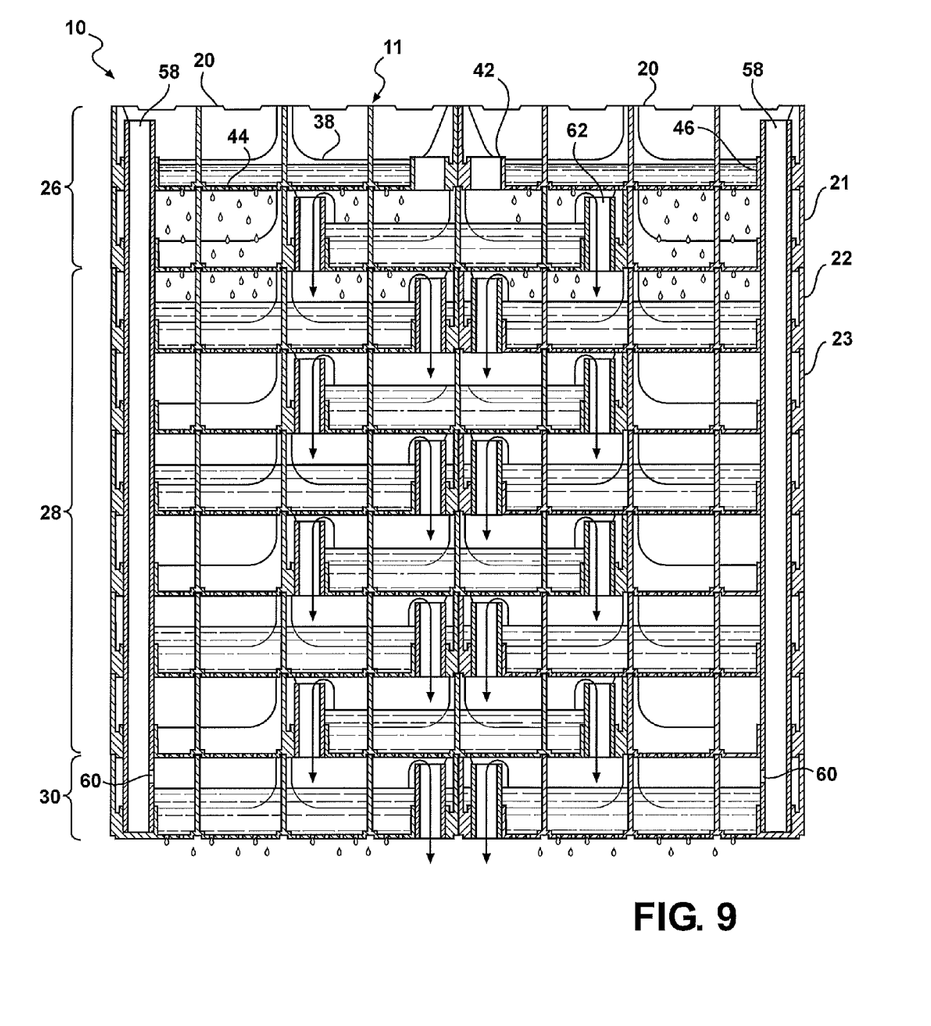
FIG. 9 is a sectional view of the water infiltration apparatus according to the present invention showing the water flow pathway defined therethrough.

Operation of the water infiltration apparatus 10 will now be explained with reference to FIG. 9. The chambers 20-24 are arranged in an interlocking, staggered configuration to define the receiving layers 26, the infiltration layers 28, and the base layer 30 of the water infiltration apparatus 10.

Initially, water enters the top end 11 of the infiltration apparatus 10 and is received within the primary receiving chambers 20 of an uppermost one of the receiving layers 26. As the water rises above the support ribs 38, the water becomes distributed amongst all of the sections 42 of the primary receiving chambers 20. During this time, water is communicated downward through the drain holes 44 into an adjacent downward receiving layer 26 or into an uppermost one of the infiltration layers 28. If the rate at which water is received within the primary and secondary receiving chambers 20, 21 of the receiving layers 26 exceeds the rate at which is can be processed through the drain holes 44, water may be directed downward into adjacent receiving layers 26 or infiltration layers 28 through the overflow columns 46.

One or more of the overflow columns 46 of the primary and secondary receiving chambers of the receiving layers may be provided with a bypass column that extends through the receiving layers 26, and may extend through one or more of the infiltration layers 28 and base layer 30. The bypass column 58 allows water to be directed downward through the water infiltration apparatus 10 to bypass one or more of the receiving layers 26 and the infiltration layers 28 before exiting the bypass column 58 through a port 60 that directs water into one of the infiltration layers 28 or into the base layer 30 through a port 60. Alternatively, the bypass column 58 could be plumbed directly to a storm drain (not shown) to handle excess storm water when the capacity of the water infiltration apparatus 10 is exceeded.

In the infiltration layers 28, water is distributed into the primary infiltration chambers 22 and the second infiltration chambers 23. The primary and secondary infiltration chambers 22, 23 provide for downward flow of the water through the water infiltration apparatus 10 through the overflow columns 46, as well as providing infiltration of the water into the soil column 14 through the infiltration apertures 54. Extension tubes 62 may be provided in the overflow columns 46 to allow adjustment of the water level at which water is allowed to pass through the overflow columns 46. It is noted that the bypass columns 58 may occupy all of the overflow columns 46 that are located within the secondary infiltration chambers 23. In this case, water would not enter the secondary infiltration chambers 23 through the overflow columns 46 and would only exit the secondary infiltration chambers 23 through the drain holes 44 and the infiltration apertures 54.

Water that reaches the bottom of the water infiltration apparatus 10 without exiting through the infiltration apertures 54 is directed into the base layer 30. Within the base layer 30, the water may exit into the soil column 14 through the drain holes 44 or through the infiltration apertures 54. Alternatively, the closed ends 56 of the overflow columns 46 in the base chambers 24 of the base layer 30 could be omitted to allow excess water to be directed from the base layer 30 into the soil 14 through the overflow columns 46. Alternatively, excess water could be directed from the overflow columns 46 into a storm drain (not shown) or into an additional water infiltration apparatus.

Figure 10:
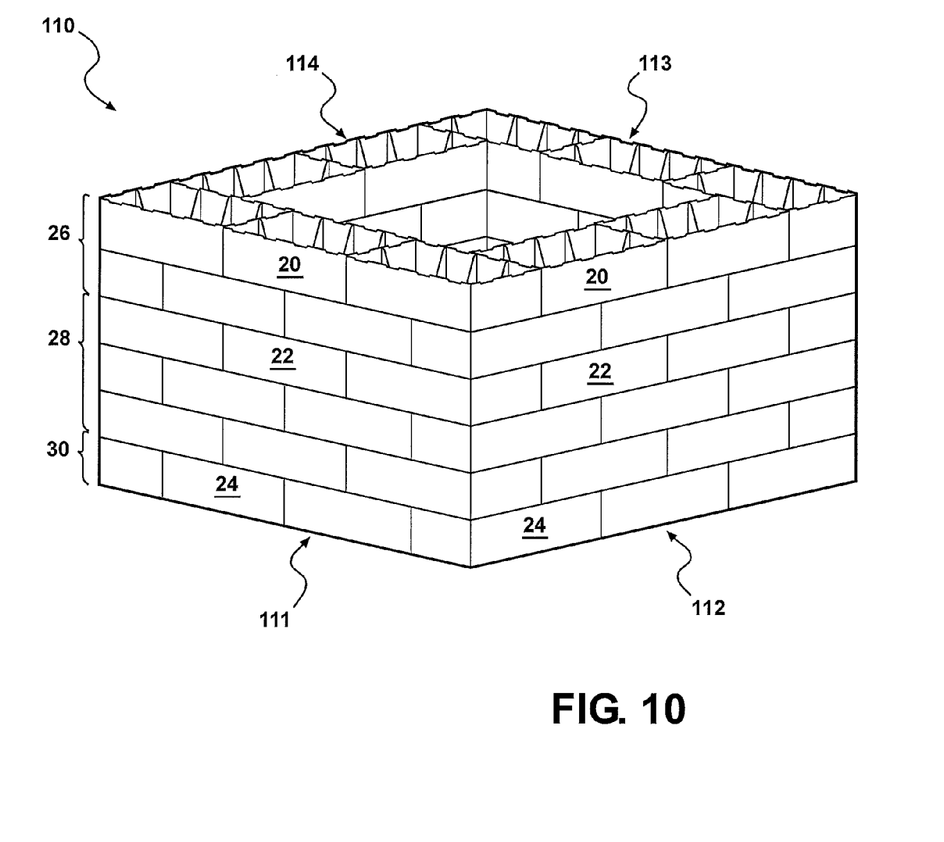
FIG. 10 is a perspective view showing a water infiltration apparatus having a ring-like configuration.

As previously noted, the modular nature of the chambers 20-24 allows for the water infiltration apparatus 10 to be provided in any desired configuration by selective arrangement of the chambers 20-24. As an example, a ring-like water infiltration apparatus 110 may be provided, as shown in FIG. 10. As described in connection with the water infiltration apparatus 10, the ring-like water infiltration apparatus 110 includes a pair of receiving layers 26, a plurality of infiltration layers 28, and a base layer 30. The layers 26, 28, 30 are arranged to form four sides 111-114 that interlock at their corners. In this regard, it should be noted that by dimensioning the primary receiving chambers 20, the primary infiltration chambers 22, and the base chambers 24 such that they have a width that is twice their length, the interlocking configuration between the sides 111-114 may be provided using chambers 20, 22, 24 that are all of a single size. In addition, it should be noted that flow may be provided within each of the individual layers 26, 28, 30 between adjacent chambers 20, 22, 24 to allow water to flow completely around the ring-like water infiltration apparatus 110, such as by providing aligned pairs of the infiltration apertures 54 in adjacent pairs of chambers 20, 22, 24, which would then serve a water distribution function instead of a water infiltration function.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A modular storm water infiltration apparatus for directing water into an adjacent soil column, comprising:
    a plurality of infiltration chambers each having a substantially planar, substantially rectangular bottom panel and a peripheral wall having a plurality of substantially planar, substantially rectangular wall portions that each extend upward from an outer periphery of the bottom panel to an upper edge of the peripheral wall, such that the bottom panel and the peripheral wall cooperate to define a thin-walled, substantially hollow, substantially rigid, substantially rectangular structure having an interior for storing water, the peripheral wall of each infiltration chamber having at least one infiltration aperture formed therethrough for communicating water laterally into the soil column, each infiltration chamber having at least one rib extending upward from the bottom panel thereof to divide the interior into a plurality of hollow sections to control lateral disbursement of water within each infiltration chamber, and each section having a plurality of drain apertures positioned therein and extending through the bottom panel for communicating water downwardly out of each section of the infiltration chamber, wherein the infiltration chambers are configured to be stacked vertically with respect to one another.

2. The modular storm water infiltration apparatus of claim 1, further comprising:
    each infiltration chamber having at least one overflow column that is positioned within one of the sections, extends upward from the bottom panel, receives water at a top end, and defines a passageway that extends through the bottom panel.

3. The modular storm water infiltration apparatus of claim 2, wherein the top end of the overflow column is higher than a top edge of the at least one rib.

4. The modular storm water infiltration apparatus of claim 1, wherein the bottom panel of each infiltration chamber is configured to engage an adjacent infiltration chamber to restrain relative motion of adjacent pairs of infiltration chambers.

5. The modular storm water infiltration apparatus of claim 1, wherein the bottom panel of each infiltration chamber is configured to engage the upper edge of the peripheral wall of an adjacent infiltration chamber to restrain relative motion of adjacent pairs of chambers.

6. The modular storm water infiltration apparatus of claim 1, further comprising:
    each infiltration chamber having at least one channel formed on the bottom panel thereof for engagement with the upper edge of the peripheral wall of an adjacent infiltration chamber to restrain relative motion of adjacent pairs of chambers.

7. The modular storm water infiltration apparatus of claim 1, wherein each infiltration chamber has at least one channel formed on the bottom panel thereof and extends parallel to and is spaced apart from each of two wall sections of the peripheral wall, wherein the channel engages the upper edge of the peripheral wall of an adjacent infiltration chamber thereby allowing the infiltration chambers to be vertically stacked in a staggered configuration.

8. The modular storm water infiltration apparatus of claim 2, further comprising:
    each infiltration chamber having slots defined by the upper edge of the peripheral wall thereof for directing water laterally into the soil column, wherein the slots are disposed entirely above the top end of the overflow column.

9. The modular storm water infiltration apparatus of claim 1, wherein the plurality of infiltration chambers includes a first group of chambers having a first length and a second group of chambers having a second length that is approximately half the first length to allow the infiltration chambers to be stacked to form a substantially rectangular, wall like structure.

10. A modular storm water infiltration apparatus for directing water into an adjacent soil column, comprising:
    a plurality of infiltration chambers each having a substantially planar, substantially rectangular bottom panel and a peripheral wall including a plurality of substantially planar, substantially rectangular wall portions that each extend upward from an outer periphery of the bottom panel to an upper edge of the peripheral wall, such that the bottom panel and the peripheral wall cooperate to define an interior for storing water;

each infiltration chamber having at least one rib extending upward from the bottom panel thereof to divide the interior into a plurality of sections to control lateral disbursement of water within each infiltration chamber;

the peripheral wall of each infiltration chamber having at least one infiltration aperture formed therethrough for communicating water laterally into the soil column;

each infiltration chamber having at least one overflow column that receives water at a top end and defines a passageway that extends through the bottom panel, wherein the top end of the overflow column is higher than a top edge of the at least one rib; and at least one channel formed on the bottom panel of each infiltration chamber for engagement with the upper edge of the peripheral wall of an adjacent infiltration chamber to restrain relative motion of adjacent pairs of chambers.

11. A storm water infiltration system, comprising:
a ground surface;
a soil column disposed below the ground surface;
an inflow basin that receives water from the ground surface; and
a plurality of infiltration chambers that are disposed within the soil column below the ground surface in a vertically-stacked configuration and receive the water from the inflow basin, each infiltration chamber from the plurality of infiltration chambers including a substantially planar, substantially rectangular bottom panel and an upright peripheral wall including a plurality of substantially planar wall portions that each extend upward from an outer periphery of the bottom panel to an upper edge of the peripheral wall, such that the bottom panel and the peripheral wall cooperate to define an interior for storing the water, at least one infiltration aperture formed through the peripheral wall for communicating water laterally into the soil column, and at least one drain aperture formed through the bottom panel.

12. The storm water infiltration system of claim 11, wherein the plurality of infiltration chambers includes a first infiltration chamber and a second infiltration chamber, and the second infiltration chamber is positioned below the first infiltration chamber such that a first portion of the water flows into the interior of the second infiltration chamber from the interior of the first infiltration chamber through the at least one drain aperture formed through the bottom panel of the first infiltration chamber, a second portion of the water flows into the soil column from the interior of the first infiltration chamber through the at least one infiltration aperture formed through the peripheral wall of the first infiltration chamber, and a third portion of the water flows into the soil column from the interior of the second infiltration chamber through the at least one infiltration aperture formed through the peripheral wall of the second infiltration chamber.

13. The storm water infiltration system of claim 11, wherein the plurality of infiltration chambers includes a first infiltration chamber and a second infiltration chamber, and the second infiltration chamber is positioned below the first infiltration chamber such that an upper edge of the peripheral wall of the second infiltration chamber engages at least one channel that is formed on the bottom panel of the first infiltration chamber, such that the first infiltration chamber is restrained from sliding laterally with respect to the second infiltration chamber.

14. The storm water infiltration system of claim 11, wherein at least one channel is formed on the bottom panel of each infiltration chamber from the plurality of infiltration chambers for engagement with an upper edge of the peripheral wall of an adjacent infiltration chamber to restrain relative motion of adjacent pairs of chambers, and the at least one channel is positioned on the bottom panel such that the plurality of infiltration chambers are stackable in a vertically-staggered configuration to form a wall-like structure.

15. The storm water infiltration system of claim 11, further comprising:
each infiltration chamber having at least one channel formed on the bottom panel thereof for engagement with an upper edge of the peripheral wall of an adjacent infiltration chamber to restrain relative motion of adjacent pairs of chambers.

16. The storm water infiltration system of claim 15, wherein the infiltration chambers are configured to be vertically stacked in a staggered configuration.

17. The storm water infiltration system of claim 15, wherein the plurality of infiltration chambers includes a first group of chambers having a first length and a second group of chambers having a second length that is approximately half the first length to allow the infiltration chambers to be stacked to form a substantially rectangular, wall like structure.

18. The modular storm water infiltration apparatus of claim 1, wherein the peripheral wall is free from openings in an upper area of the infiltration chamber that is located above a top edge of the at least one rib and below an upper edge of the peripheral wall.

19. The modular storm water infiltration apparatus of claim 1, wherein the at least one infiltration aperture is positioned on the peripheral wall in a lower area of the infiltration chamber that is located above the bottom panel and below a top edge of the at least one rib.

* * * * *